(12) United States Patent
Boddy et al.

(10) Patent No.: US 8,037,640 B2
(45) Date of Patent: Oct. 18, 2011

(54) WINDOW SURROUND MODULE

(75) Inventors: Ian Boddy, Ada, MI (US); Peter John Ellis, Rochester Hills, MI (US)

(73) Assignee: Magna Mirrors Of America, Inc., Kentwood, MI (US)

( * ) Notice: Subject to any disclaimer, the term of this patent is extended or adjusted under 35 U.S.C. 154(b) by 0 days.

(21) Appl. No.: 11/814,255

(22) PCT Filed: Jan. 18, 2006

(86) PCT No.: PCT/US2006/001996
§ 371 (c)(1),
(2), (4) Date: Jul. 18, 2007

(87) PCT Pub. No.: WO2006/078879
PCT Pub. Date: Jul. 27, 2006

(65) Prior Publication Data
US 2008/0127569 A1    Jun. 5, 2008

Related U.S. Application Data

(60) Provisional application No. 60/593,524, filed on Jan. 21, 2005.

(51) Int. Cl.
*E06B 3/00*    (2006.01)
(52) U.S. Cl. .......................... 49/506; 49/502
(58) Field of Classification Search ............ 49/502, 49/506; 296/146.1, 146.5
See application file for complete search history.

(56) References Cited

U.S. PATENT DOCUMENTS

| | | | |
|---|---|---|---|
| 4,401,320 A | 8/1983 | Okuyama et al. | |
| 4,723,793 A | 2/1988 | Kato et al. | |
| 5,000,990 A * | 3/1991 | Freeman | 428/36.1 |
| 5,317,835 A * | 6/1994 | Dupuy et al. | 49/441 |
| 5,697,665 A | 12/1997 | Itou et al. | |
| 5,746,471 A | 5/1998 | Teramoto et al. | |
| 5,964,063 A * | 10/1999 | Hisano et al. | 49/502 |
| 6,394,529 B2 * | 5/2002 | Davis et al. | 296/146.16 |
| 6,928,735 B2 * | 8/2005 | Malik et al. | 29/897.2 |
| 6,969,101 B2 * | 11/2005 | Lynam et al. | 296/1.11 |
| 7,392,970 B2 * | 7/2008 | Bachan | 249/79 |
| 2002/0003356 A1 | 1/2002 | Davis et al. | |
| 2002/0078631 A1 * | 6/2002 | Hock et al. | 49/502 |
| 2004/0049989 A1 * | 3/2004 | Florentin et al. | 49/502 |
| 2006/0131473 A1 * | 6/2006 | Bachan | 249/79 |

FOREIGN PATENT DOCUMENTS

| | | |
|---|---|---|
| DE | 42 40 365 A1 | 6/1994 |
| EP | 0 524 447 A | 1/1993 |
| EP | 0 792 766 A | 9/1997 |
| EP | 1 122 106 A2 | 8/2001 |

* cited by examiner

Primary Examiner — Jerry Redman
(74) Attorney, Agent, or Firm — Miller Canfield

(57) ABSTRACT

A window surround module (10) for installation to the perimeter of a window opening (120, 248) in a motor vehicle door panel (118, 244) comprises individual window surround components that are fabricated into a unitary structure. The individual components include two or more of a header molding (16, 130), a bell molding (18, 132), a mirror base (12, 28, 140), a B-pillar trim piece (14, 134), a glass run channel (150, 260), a wire harness (264), a wire harness support (262), seals (24, 200, 202, 2004), a mirror (30, 114), and a window (122, 246). At least some of the components are molded together to form a unit to which other components are mounted.

8 Claims, 12 Drawing Sheets

WINDOW SURROUND MODULE

CROSS-REFERENCE TO RELATED APPLICATIONS

This application claims priority on International Application No. PCT/US2006/001996, filed Jan. 18, 2006, which claims the benefit of U.S. Provisional Patent Application No. 60/593,524, filed Jan. 21, 2005, and Ser. No. 11/037,656, filed Jan. 18, 2005 which is now abandoned, all of which are incorporated herein in their entirety.

FIELD OF THE INVENTION

The invention relates to vehicle window assemblies and, more particularly, to a window surround module for a retractable window which can be installed to a vehicle door as a single unitary component.

DESCRIPTION OF THE RELATED ART

A conventional vehicle door assembly typically include a door panel comprising a lower door portion, an upper window opening, and a glass window. The window can be selectively raised to close the window opening, and lowered into the lower door portion. A window surround assembly is frequently used around the window opening in the door assembly to seal any gaps around the raised window, and guide the window as it is raised and lowered. An example of a prior art surround assembly is illustrated in FIG. 1.

The window surround assembly 10 comprises a mirror patch 12 at a forward end of the surround assembly 10 adapted for attachment of an exterior rearview mirror. A rear end of the surround assembly 10 comprises a B-pillar appliqué 14 adapted to overlay the rearward edge of the window opening. A header molding 16 (also sometimes referred to as a "reveal") extends generally parallel to the roof line of the vehicle along the upper edge of the window opening from the mirror patch 12 to the B-pillar appliqué 14. A belt channel 18 extends along the lower edge of the window opening from the mirror patch 12 to the B-pillar appliqué 14.

A front guide 20, also known as a glass run channel, extends downwardly into the interior of the lower door portion away from the belt channel 18 below the mirror patch 12, and is adapted for supporting and guiding the forward edge of the window. A below belt guide 22 extends downwardly into the interior of the lower door portion away from the belt channel 18 below the B-pillar appliqué 14, and is adapted for supporting and guiding the rearward edge of the window. A window seal 24 is typically positioned in a channel in each of the front guide 20, the header molding 16, the B-pillar appliqué 14, and the below belt guide 22, and is adapted to engage the edges of the window to form a water and windproof seal when the window is in a raised position. A mirror base 28 and a mirror head 30 are installed to the mirror patch 12 to complete the front window surround assembly 10.

Each of the foregoing surround assembly components is normally individually interconnected and assembled to the door panel on the assembly line. The assembly of the components must be completed in a way which maintains adequate fit and tolerances between the surround assembly 10 and the door panel. Maintaining such tolerances is very difficult. Frequently, the finished surround assembly 10 has gaps and imperfectly aligned components that contribute to wind noise, moisture leakage, and air leakage between the surround assembly 10, the window glass, and the door panel. As well, the individual installation of each of the above-mentioned components to the door panel is a labor-intensive and, therefore, costly operation. And when a mirror is added to the surround assembly, additional complications accrue.

Conventional rearview mirrors are complex assemblies providing more than a simple rearward view. They frequently incorporate enhanced functionality, such as turn signals, area lights, automatic dimming features, heating elements, power pivot mechanisms, power extend mechanisms, and the like. All these features can add weight to the mirror assembly, which must be carefully supported by the assembly worker while the mirror assembly is being attached to the door. This weight, in combination with the complex conventional attachment system, can also render the attachment of the mirror assembly to the door difficult, so that the fit and performance are compromised.

It is known to encapsulate discrete components of a portion of a rear window surround into a fixed window module. See, for example, U.S. Pat. No. 5,846,463 to Keeney, et al. But the problems of achieving superior fit and finish at low cost in assembling additional components to window surround remain. However, different components, such as the mirror base and mirror head, frequently must be fabricated in a manner which provides for an enhanced strength and finish compared to the remainder of the surround assembly. Different materials may be required having different thermoplastic properties, including melt temperatures. While a single module can be fabricated in several discrete steps, adding components to the module in each step, the addition of a component having a higher melt temperature than a component that has already been fabricated can adversely impact the component having a lower melt temperature.

There is a need for improvements to window surrounds in a vehicle that will reduce material and assembly costs, minimize manufacture and assembly time, make assembly easier, enhance fit and finish, and improve wind noise and sealing performance.

SUMMARY OF THE INVENTION

These and other needs are met by the present invention of a window surround module for installation to the perimeter of a window opening in a motor vehicle door panel. The window surround module comprises a prefabricated assembly of a header molding, a belt molding, a mirror base, and a glass run channel. At least two of the components are made at least partly of thermoplastic, and formed together as a unit. Consequently, the window surround module can be installed to a motor vehicle door panel as a unitary structure.

The unit can be the mirror base and the glass run channel injection molded together. Or the unit can be a first unit and two other components can be injection molded together as a second unit, with the first unit and the second unit later co-molded together. Preferably, the header molding, belt molding, mirror base, and glass run channel are made at least partly of thermoplastic, and formed together as a unit.

The prefabricated assembly can include a B-pillar trim piece, window glass mounted to the glass run channel, a mirror mounted to the mirror base, and wiring mounted to the glass run channel. For the latter, the wiring can be mounted to the glass run channel by clips, or the glass run channel can have a wiring channel with the wiring mounted to the wiring channel. If so, then preferably, the wiring channel is integrally formed with the glass run channel.

Instead of co-molding, the non-molded components can be mechanically secured to the molded unit. The unitary structure can include a rear quarter window.

Another aspect of the invention is directed to a method of fabricating a window surround module for installation to the perimeter of a window opening in a motor vehicle door panel. The methods includes the steps of providing a mold for molding at least two of a header molding, a belt molding, a mirror base, and a glass run channel; molding a thermoplastic material in the mold to form at least two of the header molding, the belt molding, the mirror base, and the glass run channel together as a unit; removing the unit from the mold after the thermoplastic material has hardened; and mounting to the unit the components of the header molding, the belt molding, the mirror base, and the glass run channel not molded in the mold to form a unitary structure for later installation to the perimeter of a window opening in a motor vehicle door panel.

The method can include molding at least three of the header molding, the belt molding, the mirror base, and the glass run channel in the mold, or molding all of the header molding, the belt molding, the mirror base, and the glass run channel in the mold. Preferably, the molding step comprises injection molding. The method can also include the step of mounting to the unit any of a mirror, a seal, and a window as part of the unitary structure.

As well, at least one of the header molding, the belt molding, the mirror base, and the glass run channel can be made at least partly of a first thermoplastic material having a first melting temperature, and at least one other of the header molding, the belt molding, the mirror base, and the glass run channel can be made at least partly of a second thermoplastic material having a second melting temperature. In one aspect, at least two of the header molding, the belt molding, the mirror base, and the glass run channel are molded together as a first unit in a first molding step, at least two other of the header molding, the belt molding, the mirror base, and the glass run channel are molded together as a second unit in a second molding step, and the first and second units are molded together to form the unitary structure.

The method can also include the step of cooling at least one component made of a first melting temperature in the mold during the molding of at least one other component having a second melting temperature. Preferably, the portion of the mold to be cooled is provided with a conduit for carrying a coolant in fluid communication with a refrigeration system.

The method can include incorporating a rear quarter window into the unitary structure, or incorporating a B-pillar trim piece into the unitary structure, or forming a wire harness support structure along the glass run channel for supporting a wire harness extending from the mirror base. In the latter method, the wire harness support structure is preferably a conduit extending longitudinally through the glass run channel. Alternatively, the wire harness support structure can include at least one clip for holding the wire harness along the glass run channel.

DESCRIPTION OF AN EMBODIMENT OF THE INVENTION

The invention is described herein with respect to a window surround module for a front driver's side door panel, and a method of the injection molding the same. However, the invention can also be utilized for a passenger's side door panel and rear door panels having window glass which is movable between an open, lowered position and a closed, raised position. A front driver's side door panel and a method of injection molding the same is described in U.S. Provisional Application Ser. No. 60/593,524, filed Jan. 21, 2005, which is fully incorporated herein. A rear door panel and a method of injection molding the same is described in U.S. application Ser. No. 11/037,656, filed Jan. 18, 2005, which is fully incorporated herein.

Figure 1:
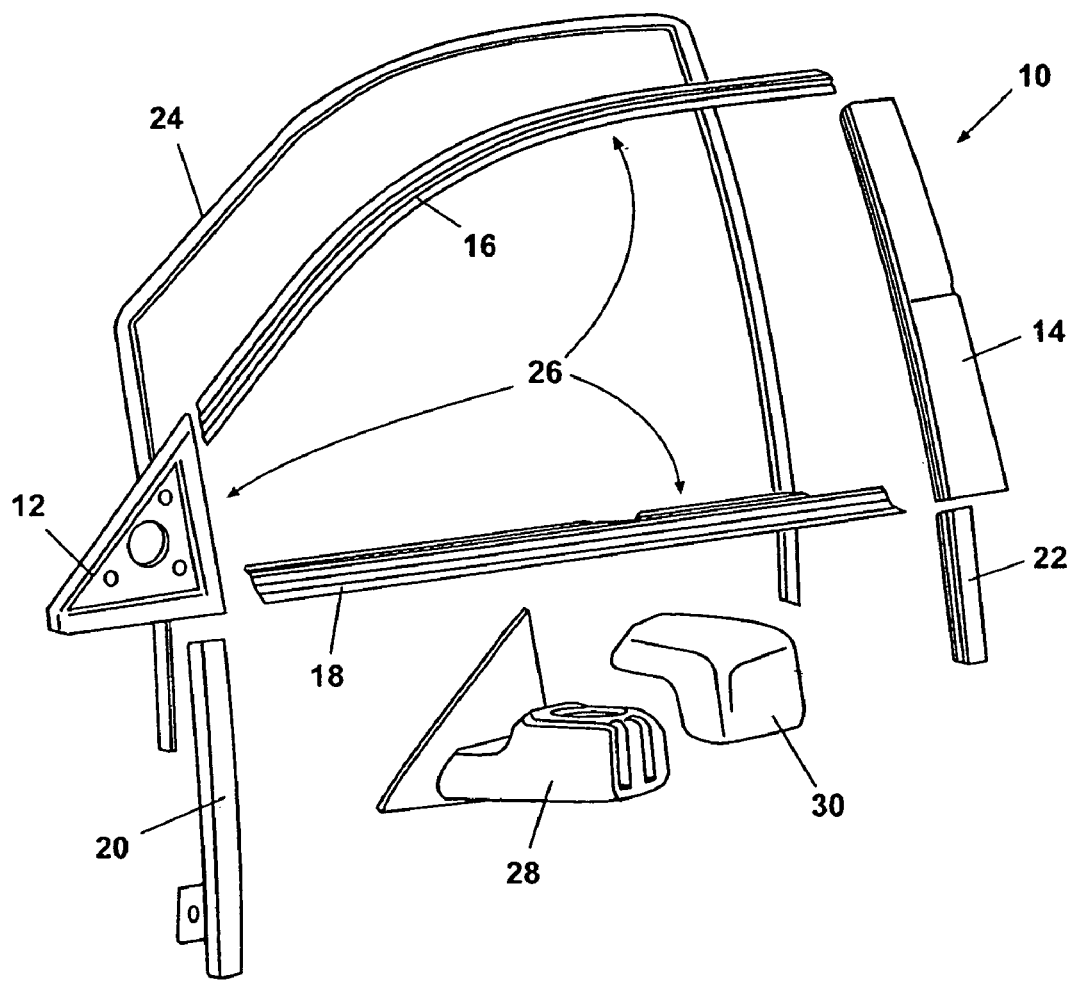
FIG. 1 is a perspective view of a portion of a motor vehicle comprising a prior art door-mounted window surround assembly, with portions shown in phantom for clarity.
Figure 2:
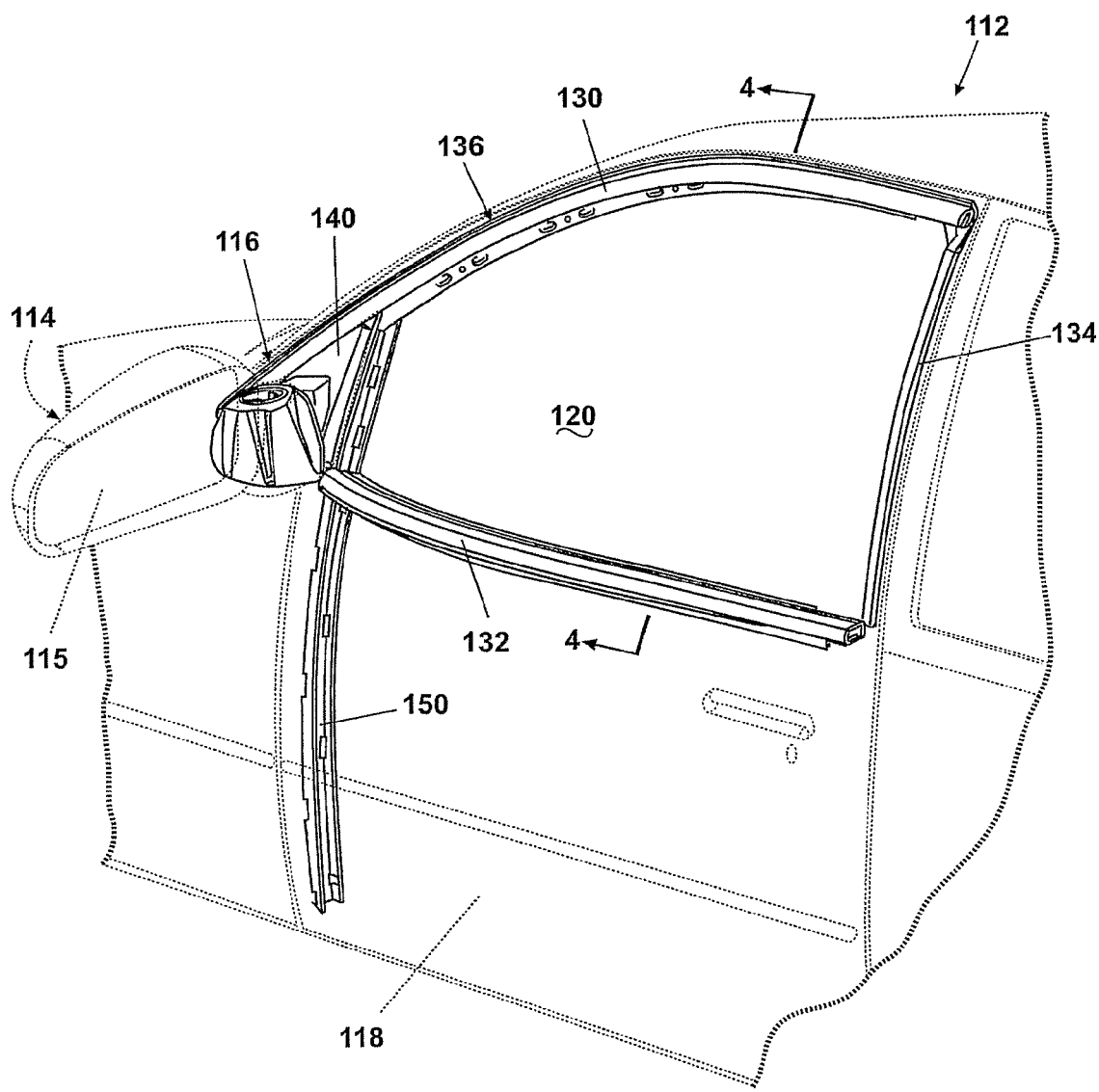
FIG. 2 is a perspective view of a portion of a motor vehicle comprising a first embodiment of a door-mounted window surround module according to the invention.

Referring to the drawings, and to FIG. 2 in particular, an embodiment of the invention is illustrated comprising a motor vehicle 112 with a door-mounted window surround module 110 according to the invention attached to a door panel 118 having a window opening 120. As also illustrated in FIG. 2, the surround module 110 comprises a base assembly 116 adapted to integrate with and support a mirror assembly 114. The mirror assembly 114 comprises a generally well-known reflective element assembly 115 for providing an occupant of the vehicle 112 with a rearward view. The reflective element assembly 115 can include selected functionalities such as a tilt actuator for adjusting the horizontal and vertical orientation of the reflective element, a defogger/defroster assembly, supplemental signal and area lights, and the like. To this end, the mirror assembly 114 and the base assembly 116 can be provided with integrated mating electrical connectors (not shown) for providing power and communication capabilities for the various functionalities of the surround module 110, which will interconnect when the mirror assembly 114 is affixed to the base assembly 116. Alternatively, conventional pig-tail connectors can be used for manual connection during attachment of the mirror assembly 114 to the base assembly 116. As well, the electrical connectors can be integrated into other components of the surround module 110, which will be interconnected when the mirror assembly 114 is affixed to the base assembly 116 and/or the surround module 110 is installed to the door panel.

As illustrated in FIG. 2, the window surround module 110 comprises an upper header molding 130 (also known as a reveal) and a lower belt molding 132 (also known as a lower belt channel), adapted for registry with the upper and lower edges of the window opening 120. References hereinafter to "forward" or "rearward" refer to a part, portion, or direction toward the front or rear, respectively, of the motor vehicle 112. Forward portions of the upper header molding 130 and the lower belt molding 132 are integrally attached to the base assembly 116. Rearward portions of the upper header molding 130 and the lower belt molding 132 are attached to a B-pillar trim piece 134 adapted for registry with the rearward edge of the window opening 120.

Figure 3:
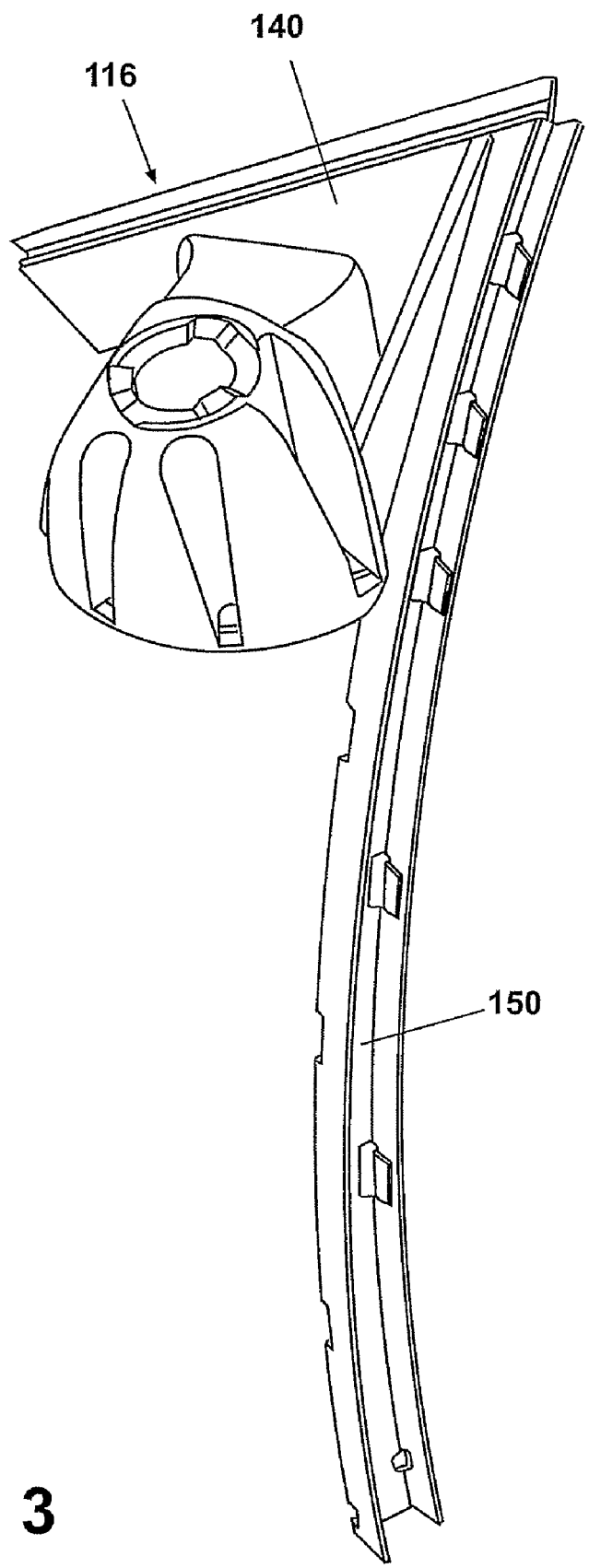
FIG. 3 is a close-up perspective view of a portion of the window surround module illustrated in FIG. 2 showing a mirror base and glass run channel.
Figure 7:
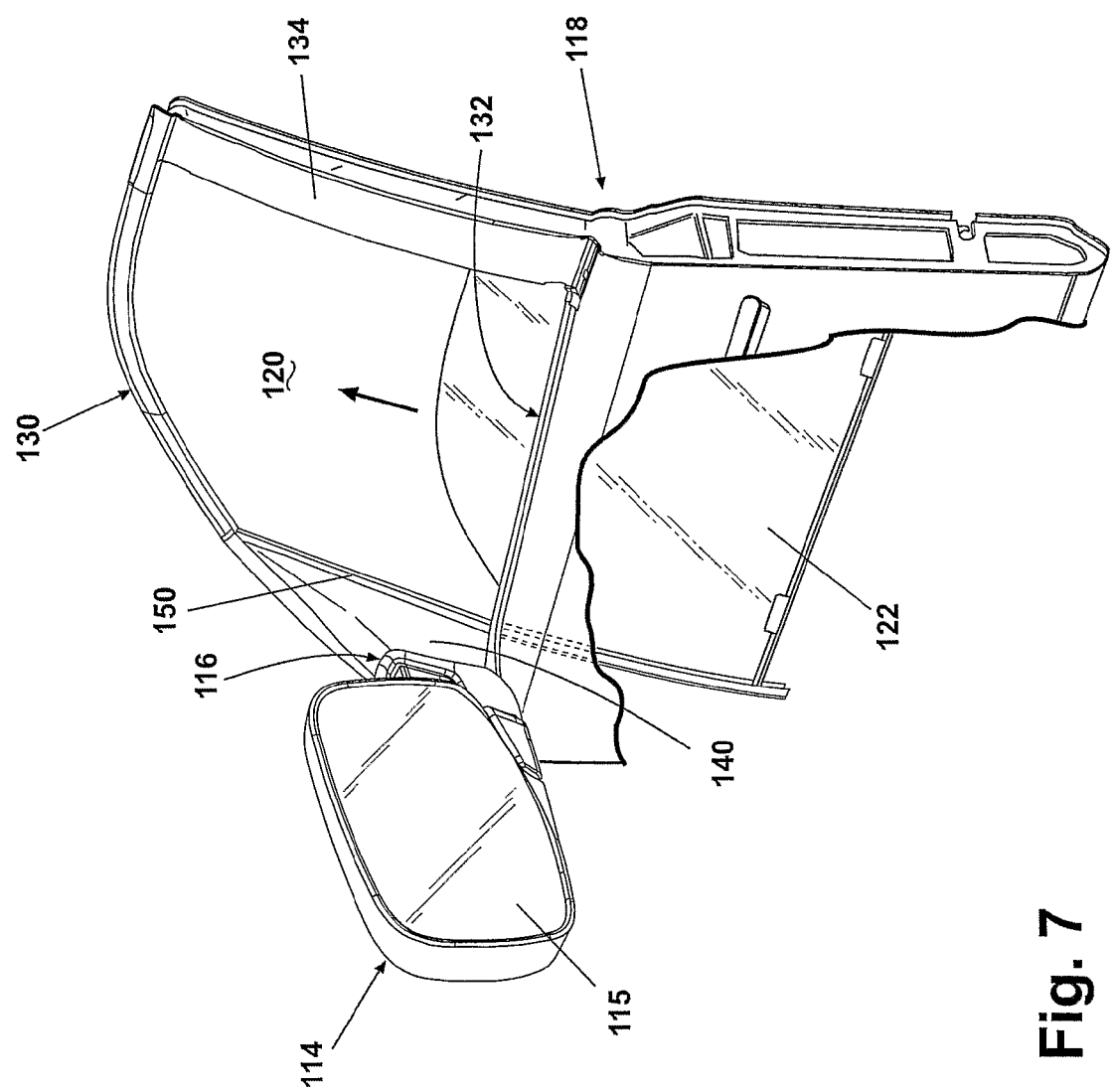
FIG. 7 is a partial cutaway perspective view of the assembled motor vehicle door of FIG. 2 illustrating the raising of a window along the glass run channel.

The base assembly 116 comprises a somewhat triangular-shaped, plate-like member 140 integrated with the header molding 130 and the belt molding 132, and adapted for support of the mirror assembly 114 at a forward portion of the door panel 118 adjacent the window opening 120. As illustrated in FIG. 3, the base assembly 116 can also be integrated with a glass run channel 150 extending downwardly from a rearward edge of the triangular member 144 supporting a forward edge of the window glass 122 (FIG. 7). The base assembly 116 and the glass run channel 150 are preferably fabricated of a suitable material, such as a high-strength plastic, having sufficient strength and durability for the purposes intended. Preferably, the base assembly 116 and the glass run channel 150 are fabricated of a thermoplastic through an injection molding process. The base assembly 116 and the glass run channel 150 may incorporate additional materials, such as steel or aluminum, to provide additional strength, improve fit, and provide attachment points for assembling the window surround module 110 to the door panel 118. The B-pillar trim piece 134 can also transition to a downwardly extending guide (not shown) similar to the glass run channel 154 supporting a rear edge of the window glass 122.

The header molding 130, belt molding 132, and B-pillar trim piece 134 are preferably fabricated of a suitable material, such as a high-strength plastic, having sufficient strength and durability for the purposes intended. Preferably, the header molding 130, belt molding 132, and B-pillar trim piece 134 are fabricated of a thermoplastic through an injection molding process. Additionally, seals, gaskets, and the like are also incorporated into the header molding 130, belt molding 132, and B-pillar trim piece 134 to provide a seal against the introduction of moisture and air around the window glass 122 when the window glass 122 is in a raised position.

Figure 4:
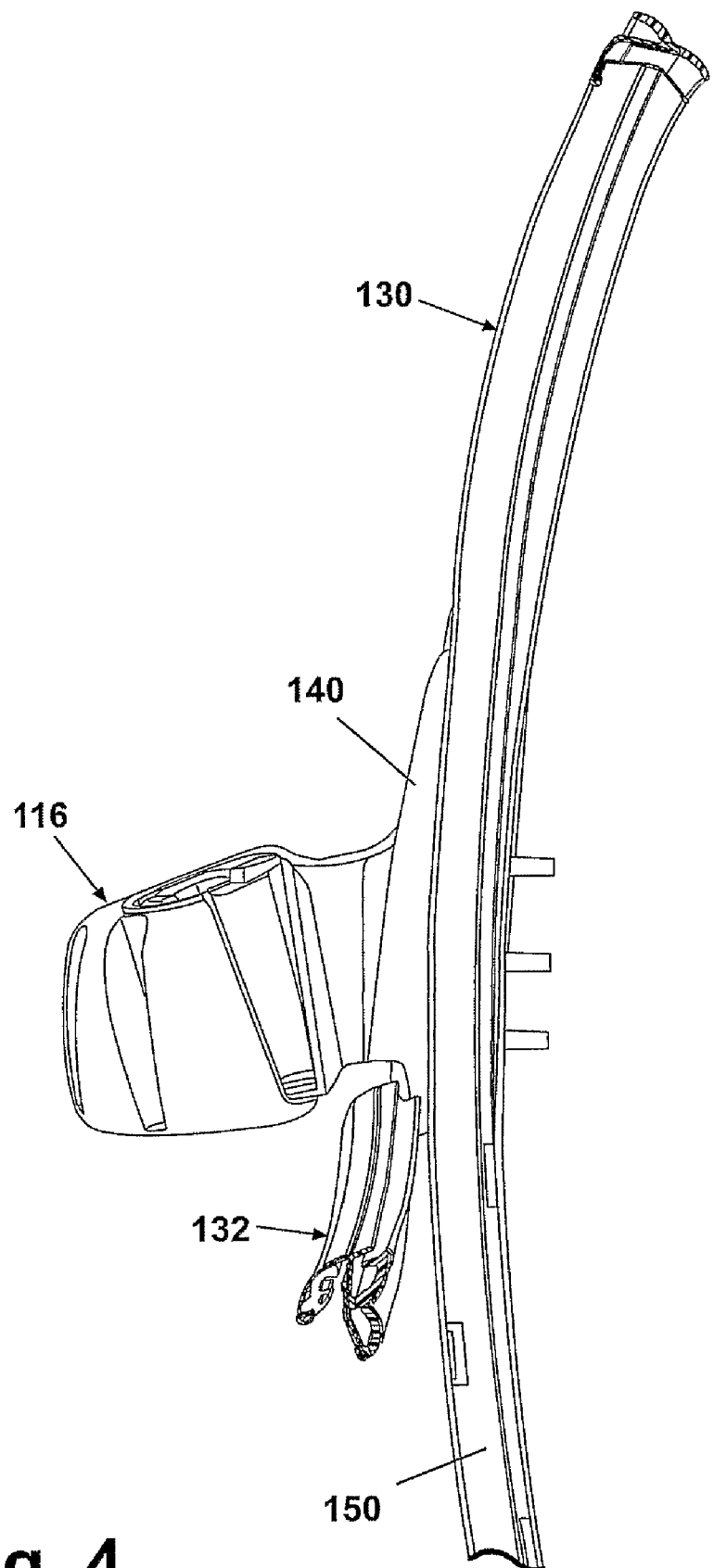
FIG. 4 is a sectional view of the window surround module illustrated in FIG. 2 taken along view line 4-4.
Figure 5:
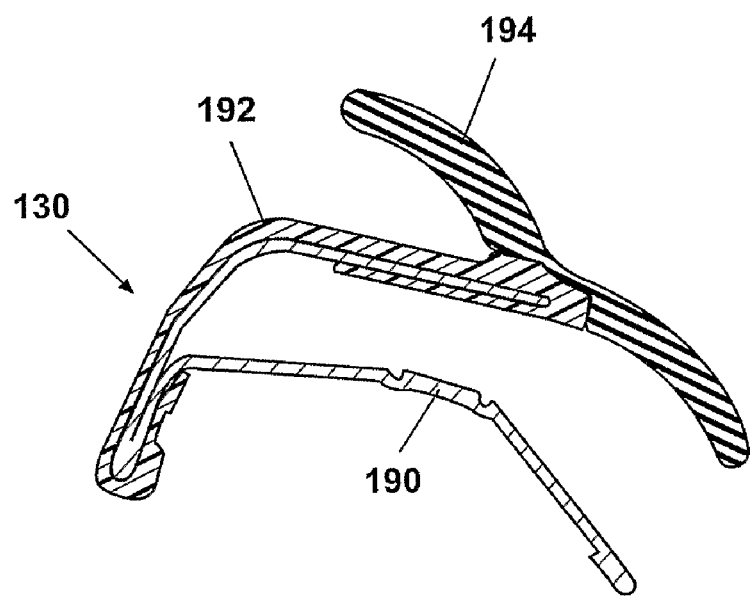
FIG. 5 is an enlarged sectional view of an upper portion of the window surround module illustrated in FIG. 4.
Figure 6:
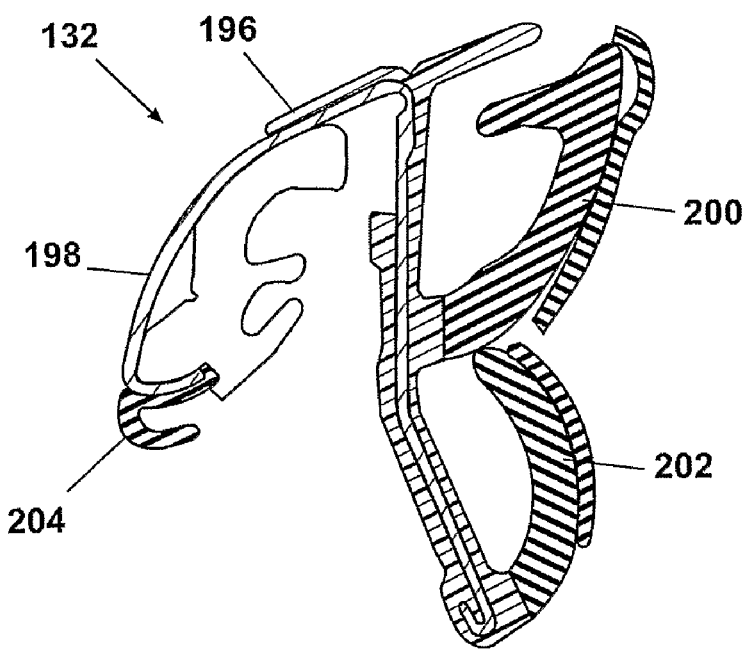
FIG. 6 is an enlarged sectional view of a lower portion of the window surround module illustrated in FIG. 4.

As illustrated in FIGS. 4 and 5, an embodiment of the header molding 130 is illustrated as comprising an upper structural member 190 in integral registry with an upper trim member 192, to which is attached a resilient upper gasket member 194. As illustrated in FIGS. 4 and 6, an embodiment of the belt molding 132 is illustrated as comprising a lower structural member 196 in integral registry with a lower trim member 198, to which are attached resilient gasket members 200, 202, 204. The structural members 190, 196 have sufficient strength and rigidity for supporting a window glass panel 122, maintaining a finished edge to the window opening 120, and supporting the glass run channel 150 and surround module 110 in the door panel 118. The structural members 190, 196 are preferably fabricated of steel.

The upper trim member 192 and the lower trim member 198 can comprise a generally well-known thermoplastic, suitable for injection molding or other appropriate thermoforming process, having sufficient strength and rigidity to form the trim members 192, 198, the base assembly 116, and the glass run channel 150, as hereinafter described. The gasket members 194, 200-204 can comprise a flexible material, such as a rubber, suitable for sealing the window surround module 110 against the door panel 118 along the perimeter of the window opening 120, and sealing the raised window glass panel 122 against the migration of air, moisture, and dirt into the door panel 118 and vehicle passenger compartment. Other suitable configurations of metal structural elements, thermoplastic members, and gaskets adapted for cooperative registry in a generally well-known manner with the door panel 118, and assembled into a rigid, frame-like structure, can be utilized depending upon the configuration of the door panel 118, window glass panel 122, aesthetic considerations, and the like.

The base assembly 116 is integrated with the header molding 130, belt molding 132, B-pillar trim piece 134, and the glass run channel 150 to form a unitary window surround module 110 that can be installed into the door panel 118 as a single unit. The window surround module 110 is installed to the door panel 118 so that the glass run channel 150 is properly positioned in the door panel 118 and the moldings 130, 132 are suitably positioned relative to the opening 120. The door panel 118 will be provided with a base assembly 116 that can readily receive the mirror assembly 114 to provide a completed vehicle door with a rear view mirror. The header molding 130, belt molding 132, B-pillar trim piece 134 are attached to the door panel 118 around the opening 84 in a generally conventional manner, with the glass run channel 150 extending downwardly into the interior of the door panel 118. The gaskets 194, 200-204 can be attached to the header molding 130, belt molding 132, B-pillar trim piece 134, and glass run channel 150 and the door panel 118 to seal the window surround module 110 to the door panel 118. Alternatively, the gaskets can be attached to the window surround module 110 prior to assembly to the door panel 118, so that the gaskets will be properly located and serviceable upon installation of the window surround module 110 to the door panel 118.

Figure 8:
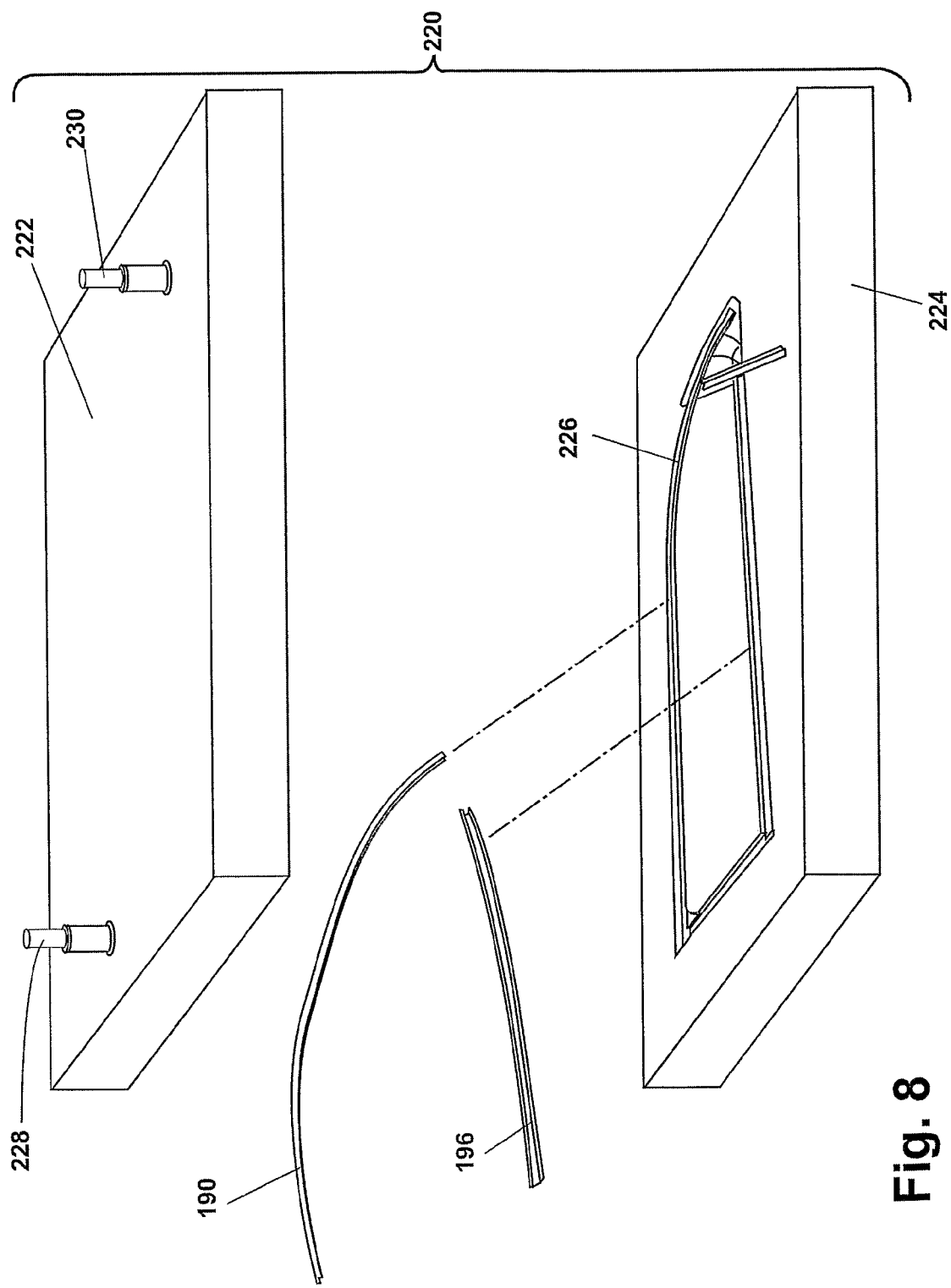
FIG. 8 is a schematic view of a first step in the forming of the window surround module illustrated in FIG. 2 illustrating an injection mold.
Figure 9:
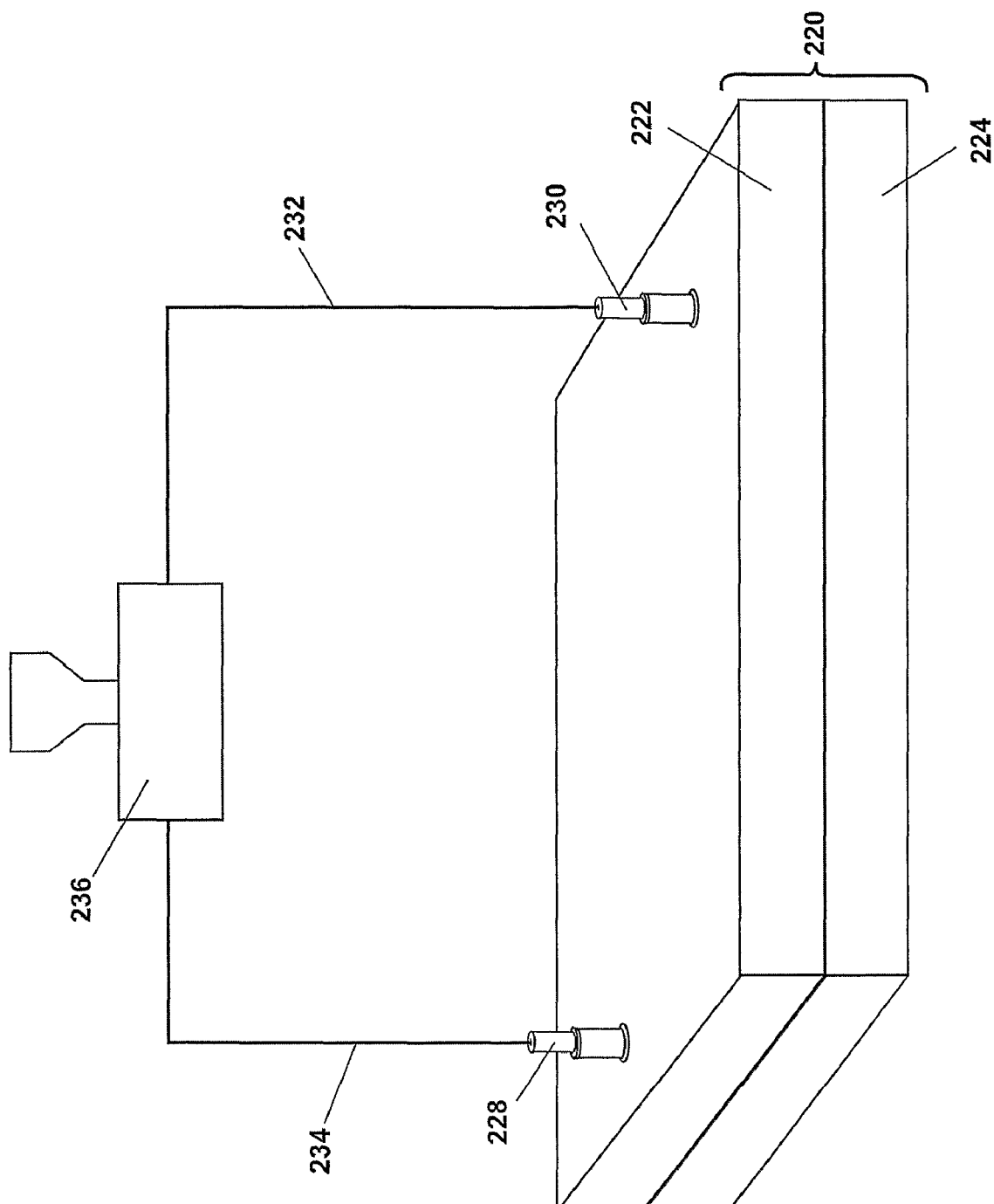
FIG. 9 is a schematic view of a second step in the forming of the window surround module illustrated in FIG. 2.
Figure 10:
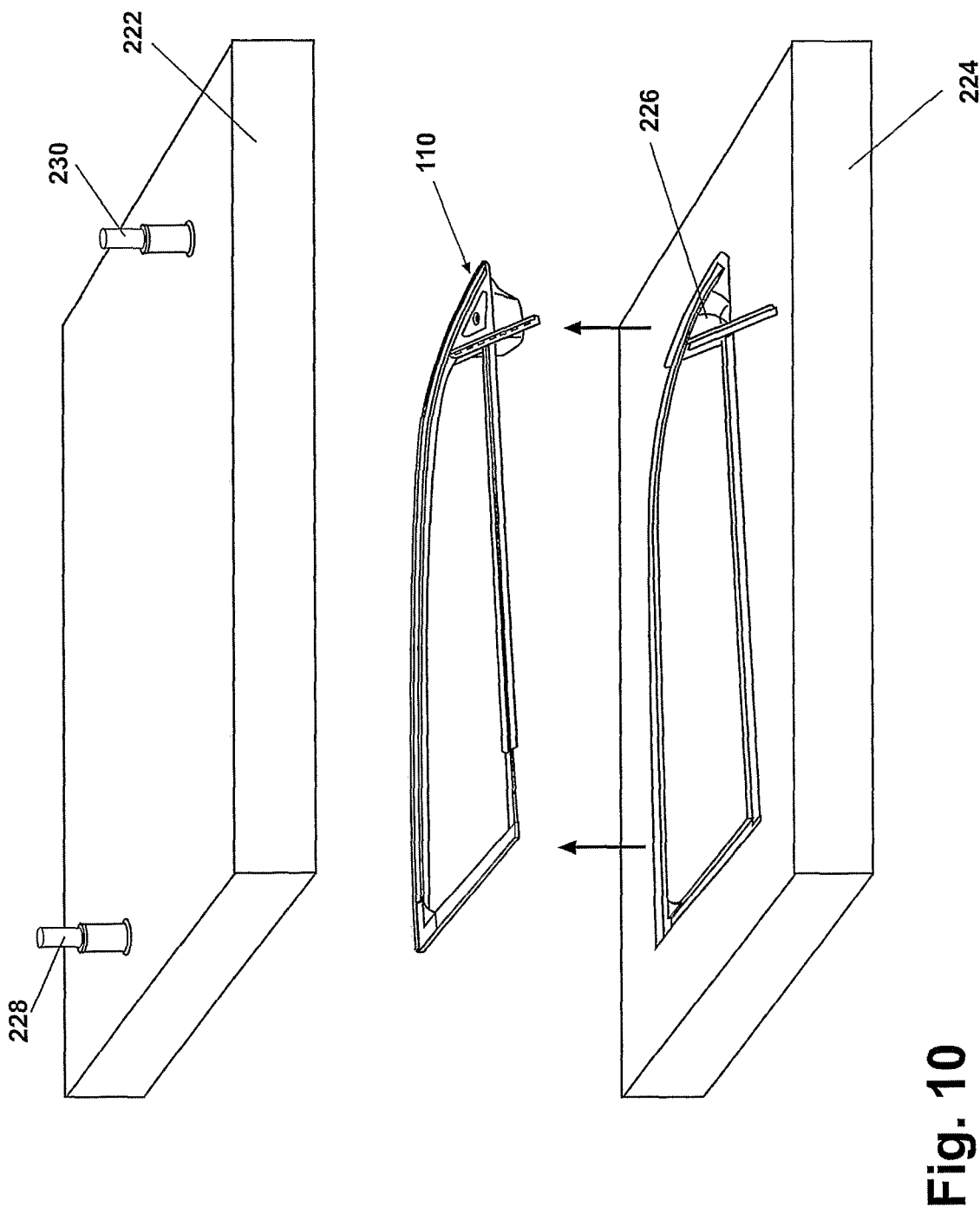
FIG. 10 is a schematic view of a third step in the forming of the window surround module illustrated in FIG. 2.

FIGS. 8-10 illustrate the general steps of fabricating the window surround module 110. The fabrication steps described herein relate to a fabrication process comprising thermoplastic injection molding, although other thermoforming processes can be employed. The upper and lower structural members 190, 196, respectively, are formed of steel, preferably stamped into an appropriate configuration for the particular installation selected. These two members 190, 196 are placed into a mold assembly 220 comprising an upper mold piece 222 and a lower mold piece 224 having a window surround module mold 226 formed therein in the configuration selected for a particular window surround module 110.

With the members 190, 196 properly positioned in the trim assembly mold 226, the upper mold piece 222 is brought into registry with the lower mold piece 224 in a well-known manner. Inlets 228, 230 in the upper mold piece 222 are fluidly connected through supply lines 232, 234 to a material delivery device 236 capable of receiving raw material, heating the material to a fluid state at a selected temperature, maintaining the fluid material at the selected temperature, delivering the fluid material through the supply lines 232, 234 to the mold assembly 220 under sufficient pressure for injection molding of the window surround module 110. The injection molding integrally forms the header molding 130, the belt molding 132, the B-pillar trim piece 134, the base assembly 116, and the glass run channel 50 into a single unitary window surround module 110. Upon completion of the process, the mold pieces 222, 224 are separated and the window surround module 110 is removed.

The thermoplastic components of the window surround module 110 can be fabricated of an ABS plastic, such as ABA. However, it will be understood that various components can be fabricated of different plastics, depending upon strength and performance requirements, such as PVC, TPV, EPDM, or other thermoplastic material suitable for injection molding. Different plastics will generally have different thermoplastic properties, including different melting temperatures. Additionally, different components can have different finish requirements. For example, the base assembly 116 may require a finer finish than other elements of the window surround module 110. Consequently, it may be desirable to utilize a different thermoplastic material having a different melt temperature for the base assembly 116 than used for the remainder of the window surround module 110.

Using different plastics, however, will typically require multiple steps in the injection molding process. For example, it may be necessary to injection mold the base assembly 116 and/or the glass run channel 150 in a separate process from the molding of the header molding 130, the belt molding 132, and the B-pillar trim piece 134 into a unitary structure. If the header molding 130, the belt molding 132, and the B-pillar trim piece 134 are initially molded into a single, unitary structure utilizing material having a first melt temperature, followed by molding of the base assembly 116 and the glass run channel 150 utilizing material having a second, higher melt temperature, in a process integrating the base assembly 116 and the glass run channel 150 to the previously molded, or "premolded," structure, there is a risk that the premolded structure will be remelted and damaged. This can be avoided, however, if a portion of the premolded structure adjacent the subsequently molded elements can be maintained at a cooler temperature to prevent remelting.

Figure 11:
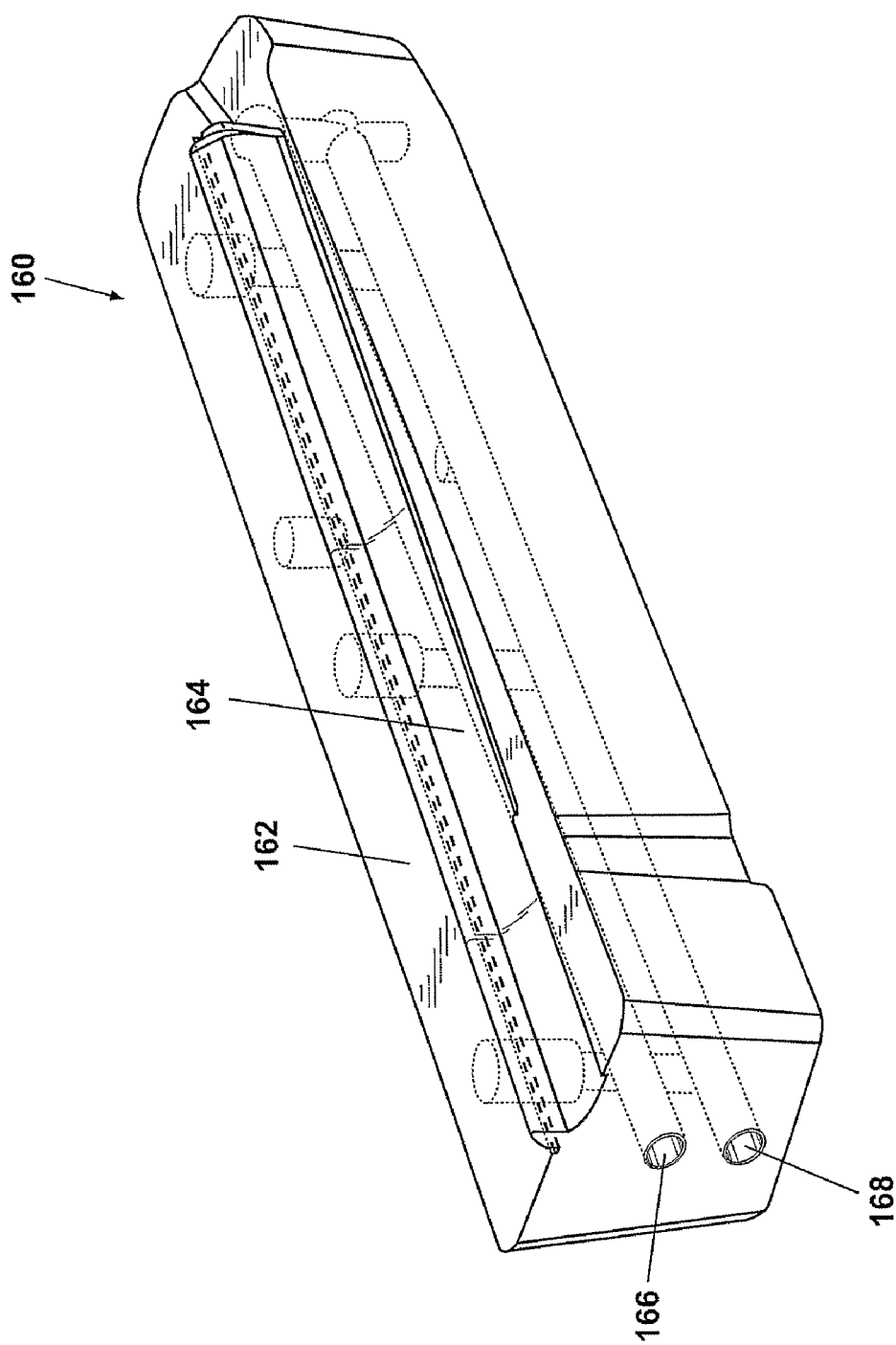
FIG. 11 is a schematic view of a portion of an injection mold incorporating cooling lines for controlling the temperature of a previously fabricated section of the window surround module during subsequent fabrication of an adjoining section.

FIG. 11 illustrates a portion of a lower mold section 160 comprising a mold block 162 having a cooling surface 164 integrated therein. The lower mold section 160 will be incorporated into the lower mold piece 224 corresponding to the portion of the previously molded structure to be cooled during the subsequent molding process. An upper mold section (not shown) complementary to the lower mold section 160 will also be incorporated into the upper mold piece 222 for cooperative registry during the assembly of the upper mold piece 222 and the lower mold piece 224 into the mold assembly 220. The lower mold section 160 is provided with a suitable network of cooling conduits extending therethrough, including a coolant supply conduit 166 fluidly connected to a coolant return conduit 168. The coolant supply conduit 166 is located adjacent the cooling surface 164 and is adapted for delivery of coolant to the region of the mold block 162 adjacent the cooling surface 164 to maintain the cooling surface 164, and the reveal component, at a preselected temperature below the applicable melt temperature. The coolant return conduit 168 delivers coolant from the region of the cooling surface 164 to a conventional closed refrigeration system.

As an example, the mold for the entire window surround module 110 can include a cooling portion adjacent the portion for molding the base assembly 116 and the glass run channel 150. After molding of selected premolded components, such as the header molding 130, the belt molding 132, and the B-pillar trim piece 134, coolant can be introduced into a cooling portion adapted to cool one or more cooling surfaces associated with the header molding 130 and the belt molding 132. The base assembly 116 and the glass run channel 150 can then be injection molded with a fluid thermoplastic at a relatively high temperature without remelting of the premolded components.

Figure 12:
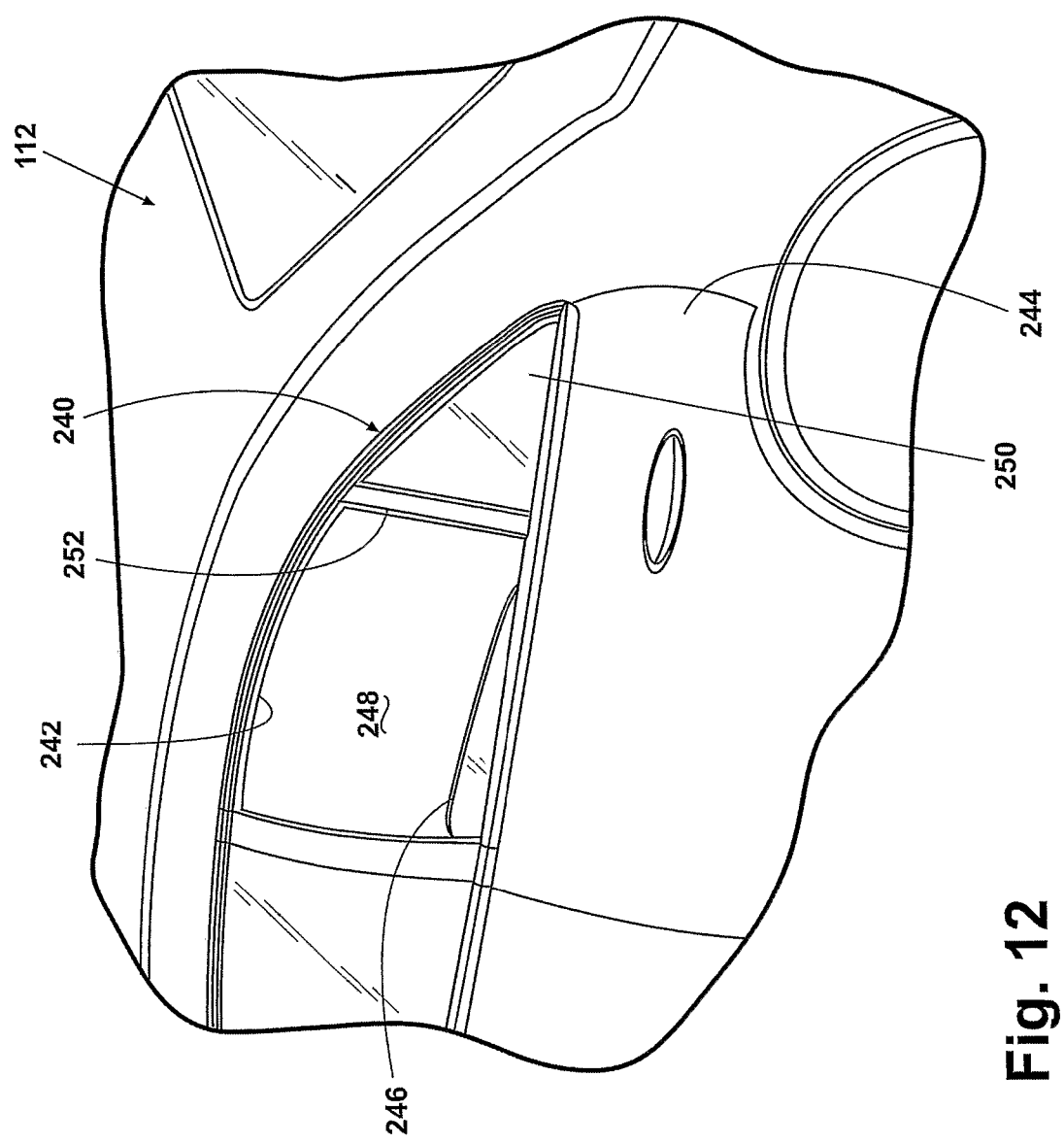
FIG. 12 is a perspective view of a portion of a motor vehicle comprising a second embodiment of a door-mounted window surround module according to the invention.

In another embodiment, such as the fabrication of a window surround module for a rear door panel, a fixed window glass panel, such as a rear quarter window, can be incorporated into the window surround module during the injection molding process. FIG. 12 illustrates a window surround module 240 comprising a reveal 242 installed in a rear door panel 244. The door panel 244 comprises a window glass panel 246 movable between a raised, closed position and a lowered, open position in a window opening 248. The door panel 244 also comprises a rear quarter window 250 extending rearwardly of the window opening 248 and separated therefrom by a division post 252. The rear quarter window 250 is fixedly mounted to the reveal 242 and the division post 252. In a manner similar to that described above, the window surround module 240 can be injection molded. The rear quarter window 250 can be placed in a suitable mold and incorporated into the window surround module 240 during the injection molding process.

Figure 13:
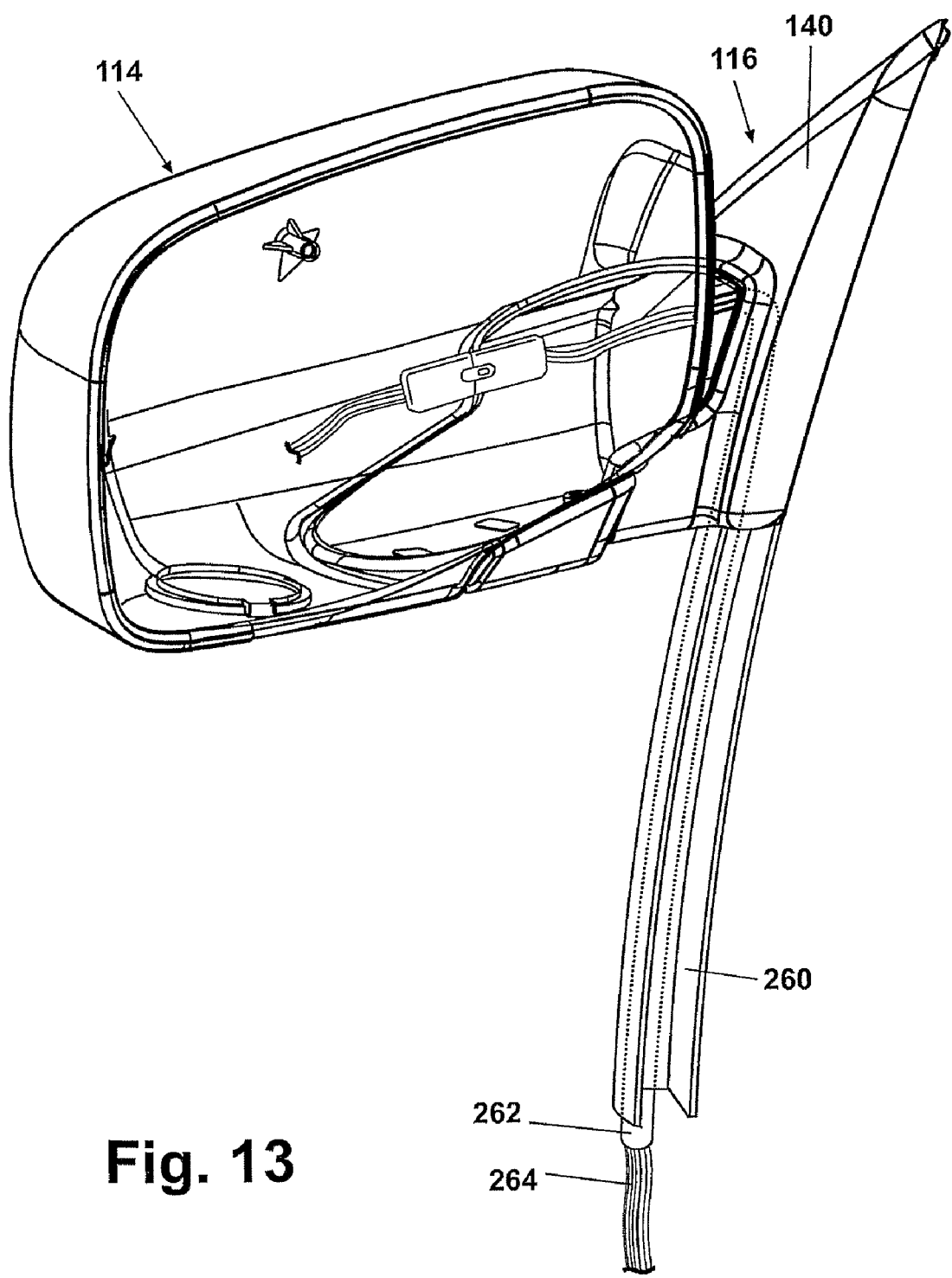
FIG. 13 is a perspective view of a third embodiment of a door mounted window surround module according to the invention.

As illustrated in FIG. 13, another embodiment of a window surround module comprises a glass run channel 260 having a wire harness support structure, illustrated as a wire harness conduit 262, extending longitudinally therethrough. The wire harness conduit 262 is formed during the injection molding process and adapted to enclose a wire harness 264 extending from the mirror assembly 114 into the door panel 118 for connection to the vehicle power and control systems. The wire harness 264 can also be incorporated directly into the glass run channel 260 during the injection molding process. After assembly of the window surround module in the door panel 118, the wire harness 264 can be connected to the reflective element assembly 115 and to a wire harness in the interior of the door panel 118 connected to the vehicle power and control systems. In another embodiment, the glass run channel can be fabricated with clips or other suitable fasteners along a forward edge of the glass run channel for clipping the wire harness 264 longitudinally along the glass run channel between the mirror assembly 114 and a wire harness in the interior of the door panel 118.

Other modifications of the foregoing are within the scope of the invention. For example, it may be desirable in any given application to mechanically attached one or more components to other premolded components to produce the window surround module. The mirror base assembly and the glass run channel can be injection molded into a single unit, and the belt molding and the header molding thereafter secured to the molded unit to form a window surround module for later installation onto a door panel. In some cases, the B-pillar trim piece will not be molded or fabricated with other components of the window surround module in order to accommodate different tolerances in the window opening during installation. It is believed that much wind noise is generated by gaps heretofore found in piecemeal installation of the mirror base assembly, the glass run channel, the belt molding, and the header molding so to the extent that they can be formed into a module prior to installation, much of the wind noise problem is ameliorated.

It is also contemplated that a window surround module can include the window pre-installed into the glass run channel and a guide extending downwardly from the B-pillar trim piece. As well, a mirror can be pre-assembled to the window surround module with any needed electrical wiring run through the wire harness conduit to a single connector. In this way, a complete window module can be installed to the door panel in one operation, requiring only a physical connection of the electrical connector to a wiring harness in the vehicle, and connection of the window to any raising and lowering mechanism in the door panel.

A door mounted window surround module according to the invention provides improved performance related to fit and finish, moisture and dirt sealing, and noise reduction. The window surround module provides a single component that fulfills both functional and decorative requirements while minimizing assembly costs. Improved sealing reduces water, wind, and aspiration leaks, improves window regulator cranking effort, and reduces buzzing, squeaking and rattling typically experienced with conventional vehicle window assemblies. The modular configuration eliminates obvious joint lines and mismatched materials, reduces visible rubber, and improves craftsmanship. The door-mounted window surround module described herein is readily attached to the door panel of a motor vehicle using a minimal number of fasteners installed by a single worker. The window surround module incorporates, at a minimum, a mirror base assembly, which is pre-attached to the door panel with the window surround module and ready to receive a mirror assembly.

The integration of the mirror base assembly, the glass run channel, and the reveal into a single modular unit enables these previously separate components to be installed to the door panel in fewer assembly steps, with improved fit, maintenance of closer tolerances, and enhanced performance of the mirror assembly and the window assembly.

While the invention has been specifically described in connection with certain specific embodiments thereof, it is to be understood that this is by way of illustration and not of limitation. Reasonable variation and modification are possible within the scope of the foregoing description and drawings without departing from the spirit of the invention.

What is claimed is:

1. A method of fabricating a window surround module, including a header molding, a belt molding, a glass run channel, and a mirror base, for installation around a window opening in a motor vehicle door panel utilizing a mold assembly having a mold section including a cooling surface, the method comprising the steps of:

molding the header molding and belt molding using a thermoplastic material having a first melting temperature;

cooling the cooling surface associated with the formation of the header molding and the belt molding;

molding the mirror base and the glass run channel using a thermoplastic material having a second melting temperature greater than the first melting temperature;

maintaining the header molding and belt molding at a temperature below the first melting temperature while the thermoplastic material for the mirror base and the glass run channel is heated to the second melting temperature; and removing the window surround module from the mold.

2. The method of claim 1 wherein the window surround module includes a window glass mounted to the glass run channel.

3. The method of claim 1, further comprising incorporating a rear quarter window into the window surround module.

4. The method of claim 1, further comprising incorporating a B-pillar trim piece into the window surround module.

5. The method of claim 1, further comprising forming a wire harness support structure along the glass run channel for supporting a wire harness extending from the mirror base.

6. The method of claim 5, wherein the wire harness support structure is a conduit extending longitudinally through the glass run channel.

7. The method of claim 5, wherein the wire harness support structure comprises at least one clip for holding the wire harness along the glass run channel.

8. The method of claim 1 wherein the step of cooling the cooling surface associated with the formation of the header molding and the belt molding includes the step of delivering coolant to the cooling surface via a coolant supply conduit.

* * * * *